UNITED STATES PATENT OFFICE.

DENISON W. CHAPMAN, OF SOUTH PARK, ILLINOIS.

PREPARATION OF PEPTONIZED FOODS.

SPECIFICATION forming part of Letters Patent No. 397,222, dated February 5, 1889.

Application filed November 9, 1888. Serial No. 290,403. (No specimens.)

*To all whom it may concern:*

Be it known that I, DENISON W. CHAPMAN, a citizen of the United States, residing at South Park, Cook county, Illinois, have invented a new and Improved Process for the Manufacture of Peptonized Foods, of which the following is a specification.

Peptone, as is well known, is the resultant end product of the action of the peptic ferment of the digestive tract upon albuminoids; and the purpose of my process is to produce peptone in a more suitable and palatable condition for food purposes than heretofore obtained.

In carrying out my process I employ either the albuminoids of milk (caseine) or those of meat, albumen, (soluble,) and meat fiber, (insoluble,) and I will describe the process as applicable to all of these, although I do not intend to limit myself to the application of my process to these albuminoids alone, as any other animal albuminoid treated in the manner hereinafter described will produce the same results.

If caseine be employed, I first remove the fats (butter) from the milk by any of the well-known mechanical methods, and taking the remaining portion heat it to the boiling-point, and then, by the addition of hydrochloric acid, I coagulate the caseine. In adding hydrochloric acid I prefer to use it in the proportion of one part of acid, specific gravity 1.16, to fourteen hundred parts of milk; but these proportions may be varied and the quantity of hydrochloric acid increased or diminished as may be found advisable. The liquid portion, containing the lactine and salts, is then separated from the coagulated caseine by filtration, pressure, or in any other suitable manner. I then wash the coagulated caseine thoroughly with water, such washings being added to the previously-separated liquid portion, after which such liquid portion, together with the washings, is evaporated to a soft or sirupy condition. In the meantime the coagulated and washed caseine is artificially digested into solution in the following manner: The caseine, being in the moist condition usual to thorough drainage or ordinary hand-pressure, is weighed and suspended in about double its weight of water. To this mixture is added hydrochloric acid of specific gravity 1.16 in any desired quantity between the limits of fifty to two hundred grains per pound of coagulated caseine, this depending upon the object desired to be attained as to the degree of ready solubility of the product, as the subsequent addition of sodium carbonate to neutralize the acid gives by reaction chloride of sodium, which salt tends to retard or prevent the solubility of peptone, yet is of much value in the product as an antiseptic. To the mixture of coagulated caseine, water, and hydrochloric acid I now add about one-eighth part of the weight of the coagulated caseine of the carefully dissected and cleansed mucous coat of the stomach of the hog and digest the mixture at a temperature of 100° to 120° Fahrenheit for a period of three hours or less, if sufficient to convert the caseine. If this amount of membrane be not sufficient, then at the expiration of the mentioned time another like proportion is added and the digestion continued in the same manner until the proper state of peptonization is reached, which is known by the disappearance of all particles of caseine, the separation of remaining traces of fat, which quickly gravitate to the surface of the liquid upon agitation, and the homogeneous slightly translucent appearance of the liquid, which is to the taste distinctly bitter. The remaining traces of fat are now mechanically separated, and the liquid heated to the boiling-point. To destroy any unexhausted portions of the peptic ferment, sufficient sodium carbonate is added to leave the solution slightly acid to litmus, when it is evaporated by water or steam bath, either openly or by vacuum, to a sirupy liquid. The former portion or sirupy extractive is now added to the dense peptone solution and the evaporation of the mixed products continued to dryness, when the whole is finely powdered.

In applying my improved process to the albuminoids of meat I take the entire constituents, both soluble and insoluble, and boil them for a time sufficient to thoroughly extract the soluble constituents and coagulate the soluble albumen. The fats are then separated by gravitation, and I then separate the coagulated albumen, together with the insoluble fiber, by filtration, pressure, or any other suitable method. The fiber and coagulated albumen are further washed with water to remove any traces of the soluble constituents. I then take the combined liquids which have been separated from the insoluble parts and add sufficient sodium carbonate to leave the solution with very slight acid reaction upon litmus and evaporate them to the condition of a soft extractive. In the meantime the mixed coagulated albumen and fiber are artificially digested into solution, such solution neutralized by the addition of sodium carbonate and evaporated to the condition of a soft extractive, precisely as above described in reference to caseine, the two extractives mixed together, evaporated to dryness, and powdered.

The advantages of this process are, first, by this method all portions of these foods are represented in the product; second, that the albuminoids only are acted upon by the peptic ferment, thus avoiding the production of undesirable products or obnoxious odors and taste which are generated by the action of the peptic ferment upon the soluble constituents, whether they be substances of repair or waste; third, the final continuation of the evaporation to the practical expulsion of moisture removes any traces of obnoxious odors, and the product is left in a palatable condition without the addition of antiseptics.

I claim—

1. The process of manufacturing peptonized foods, which consists in removing the fats from albuminoids, heating the remaining portion to the boiling-point, coagulating the albumen by the addition of hydrochloric acid, separating the liquid portion from the coagulated albumen, washing such albumen, adding such washings to the liquid portion already separated, evaporating such liquid portion to the condition of a soft extractive, meanwhile digesting the coagulated albumen into solution, as above described, adding sodium carbonate to the solution, evaporating it to the condition of a soft extractive, finally mixing the two extractives, evaporating the mixture to dryness, and powdering the same, substantially as described.

2. The process of manufacturing peptonized foods, which consists in boiling the soluble and insoluble constituents of an albuminoid for time sufficient to extract the soluble constituents and coagulate the soluble albumen, separating the fats, separating the insoluble fiber and coagulated albumen from the liquids, washing the insoluble parts, adding sodium carbonate to the liquid parts and evaporating them to the condition of a soft extractive, meanwhile artificially digesting the fiber and coagulated albumen into solution, as above set forth, neutralizing such solution by the addition of sodium carbonate and evaporating it to the condition of a soft extractive, finally mixing the two extractives, evaporating such mixture to dryness, and powdering the same, substantially as described.

DENISON W. CHAPMAN.

Witnesses:
L. RINGLE,
GEORGE S. PAYSON.